(12) United States Patent
Cheng

(10) Patent No.: US 10,306,033 B1
(45) Date of Patent: May 28, 2019

(54) MOBILE TERMINAL

(71) Applicant: GUANGDONG OPPO MOBILE TELECOMMUNICATIONS CORP., LTD., Dongguan, Guangdong (CN)

(72) Inventor: Jiao Cheng, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/175,233

(22) Filed: Oct. 30, 2018

(30) Foreign Application Priority Data

Feb. 9, 2018 (CN) .................. 2018 2 0245505 U

(51) Int. Cl.
*H04M 1/02* (2006.01)

(52) U.S. Cl.
CPC ....... *H04M 1/0264* (2013.01); *H04M 1/0266* (2013.01)

(58) Field of Classification Search
None
See application file for complete search history.

(56) References Cited

U.S. PATENT DOCUMENTS

| | | | | |
|---|---|---|---|---|
| 6,922,212 B2* | 7/2005 | Nakakubo | ............ | H04N 5/2251 348/373 |
| 7,432,977 B2* | 10/2008 | Chiang | ............. | G02B 26/0816 348/344 |
| 9,467,540 B2* | 10/2016 | Feng | .................... | H04M 1/0208 |
| 2002/0077145 A1* | 6/2002 | Kamiya | ............. | H04M 1/0214 455/556.1 |
| 2002/0160724 A1* | 10/2002 | Arai | ..................... | H04N 5/2252 455/575.1 |

(Continued)

FOREIGN PATENT DOCUMENTS

| | | |
|---|---|---|
| CN | 202998184 U | 6/2013 |
| CN | 104469114 A | 3/2015 |

(Continued)

OTHER PUBLICATIONS

International Search Report in international application No. PCT/CN2018/112690, dated Jan. 30, 2019.

(Continued)

*Primary Examiner* — Tuan A Tran
(74) *Attorney, Agent, or Firm* — Ladas & Parry LLP

(57) ABSTRACT

Mobile terminal includes rear housing including includes first surface, second surface sunken toward the first surface to form groove, first side circumference, second side circumference, third side circumference and fourth side circumference; display screen arranged at one side where the first surface is located; mounting seat; photographing module. The seat is rotatablely connected to the housing. Rotation axis of the seat passes through circle center of circumcircle of positive projection of the seat on reference plane. The module is arranged on the seat. The seat can be rotated relative to the housing through first position and second position. At the first position, the module is located in the groove, and first light entering surface of the module is blocked by the screen. At the second position, the module is located out of the groove and the first light entering surface is exposed from one side where the screen is located.

13 Claims, 11 Drawing Sheets

(56) References Cited

U.S. PATENT DOCUMENTS

| | | | | |
|---|---|---|---|---|
| 2004/0012701 A1* | 1/2004 | Nagai | ................... | G06F 1/1616 |
| | | | | 348/333.12 |
| 2005/0195322 A1* | 9/2005 | Park | ................... | H04M 1/0247 |
| | | | | 348/373 |
| 2008/0031606 A1* | 2/2008 | Zax | ........................ | G03B 29/00 |
| | | | | 396/56 |
| 2008/0194290 A1* | 8/2008 | Lebert | .................... | G01D 5/145 |
| | | | | 455/556.1 |
| 2009/0156272 A1* | 6/2009 | Ohuchi | ................. | H04B 1/385 |
| | | | | 455/575.1 |
| 2015/0109475 A1* | 4/2015 | Matilainen | .......... | H04M 1/0264 |
| | | | | 348/222.1 |

FOREIGN PATENT DOCUMENTS

| | | |
|---|---|---|
| CN | 204216938 U | 3/2015 |
| CN | 106817450 A | 6/2017 |
| CN | 207491002 U | 6/2018 |
| CN | 207491003 U | 6/2018 |
| CN | 207491004 U | 6/2018 |
| CN | 207491005 U | 6/2018 |
| WO | 2018196824 A1 | 11/2018 |

OTHER PUBLICATIONS

Written Opinion of the International Search Authority in international application No. PCT/CN2018/112690, dated Jan. 30, 2019.

* cited by examiner

MOBILE TERMINAL

CROSS-REFERENCE TO RELATED APPLICATION

The present application claims benefit of Chinese Patent Application 201820245505.8, filed on Feb. 9, 2018, the contents of which are hereby incorporated by reference in its entirety.

TECHNICAL FIELD

The present disclosure relates to the technical field of mobile terminals.

BACKGROUND

Generally, a mobile terminal (a mobile phone, tablet computer and the like) is equipped with a front camera. The front camera may be configured to provide functions such as a video call and a selfie. The front camera needs to occupy a part of area of one side, where a display screen is located, of the mobile terminal, which is not beneficial to improving the screen-to-body ratio of the mobile terminal.

SUMMARY

A mobile terminal includes: a rear housing, a display screen, a mounting seat and a photographing device.

The rear housing includes a first surface, a second surface arranged opposite to the first surface, and a side circumference connected between the first surface and the second surface. The side circumference includes a first side circumference, a second side circumference arranged opposite to the first side circumference, a third side circumference and a fourth side circumference arranged opposite to the third side circumference. The third side circumference is connected between one end of the first side circumference and one end of the second side circumference at one side, and the fourth side circumference is connected between another end of the first side circumference and another end of the second side circumference at another side. The second surface is sunken toward the first surface to form a groove. The groove is penetrated through the first side circumference. The groove is located between the third side circumference and the fourth side circumference.

The display screen is arranged at one side where the first surface is located.

The mounting seat is arranged in the groove and capable of being rotated relative to the rear housing. A rotation axis of the mounting seat passes through a circle center of a circumcircle of a positive projection of the mounting seat on a reference plane. The reference plane is perpendicular to the thickness direction of the mobile terminal.

The photographing device is arranged on the mounting seat. The photographing device is provided with a first light entering surface. The mounting seat is capable of being rotated relative to the rear housing through a first position and a second position. When the mounting seat is at the first position, the photographing device is located in the groove and the first light entering surface is blocked by the display screen. When the mounting seat is at the second position, the photographing device is located out of the groove and the first light entering surface is exposed from one side where the display screen is located.

BRIEF DESCRIPTION OF DRAWINGS

In order to describe the technical solutions in the embodiments of the present disclosure or in the prior art more clearly, a simple introduction on the accompanying drawings which are needed in the description of the embodiments or the prior art is given below. Apparently, the accompanying drawings in the description below are merely some of the embodiments of the present disclosure, based on which other drawings may be obtained by those of ordinary skill in the art without any creative effort.

DETAILED DESCRIPTION

In order to understand the present disclosure conveniently, the disclosure will be described more comprehensively with reference to relevant accompanying drawings. Preferred embodiments of the disclosure are given in the accompanying drawings. However, the disclosure may be implemented in many different forms and is not limited to the embodiments described herein. On the contrary, providing these embodiments is to understand the disclosed content of the disclosure more thoroughly and comprehensively.

Unless otherwise defined, all technical and scientific terms used herein have the same meaning as commonly understood by a person skilled in the art to which this disclosure belongs. The terms used herein are merely for describing the specific embodiments and do not limit the disclosure. The term "and/or" includes any and all combinations of one or more related listed items.

As used herein, the term "Communication Terminal" (or hereinafter referred to as a "Terminal") includes, but not limited to, a device configured to connect via a wired circuit (for example, via a Public Switched Telephone Network (PSTN), a Digital Subscriber Line (DSL), a digital cable, a direct cable connection and/or another data connection/network) and/or receive/send a communication signal via a wireless interface of (for example, a cellular network, a Wireless Local Area Network (WLAN), a digital television network such as a (Digital Video Broadcasting-Handheld (DVB-H) network, a satellite network, an AM-FM broad transmission equipment and/or another communication terminal). The communication terminal configured to communicate via a wireless interface may be referred to as a "wireless communication terminal", a "wireless terminal" and/or a "mobile terminal". Examples of the mobile terminal include, but not limited to, a satellite or cellular telephone, a Personal Communication System (PCS) terminal capable of combining with a cellular wireless telephone and data processing, faxing and data communication abilities, a Personal Digital Assistant (PDA) that may include a radio telephone, a pager, an internet/intranet access, a Web browser, a memo pad, a calendar and/or a Global Position System (GPS) receiver, and a conventional laptop and/or palmtop receiver or other electronic devices comprising a radio telephone receiver.

Figure 1:
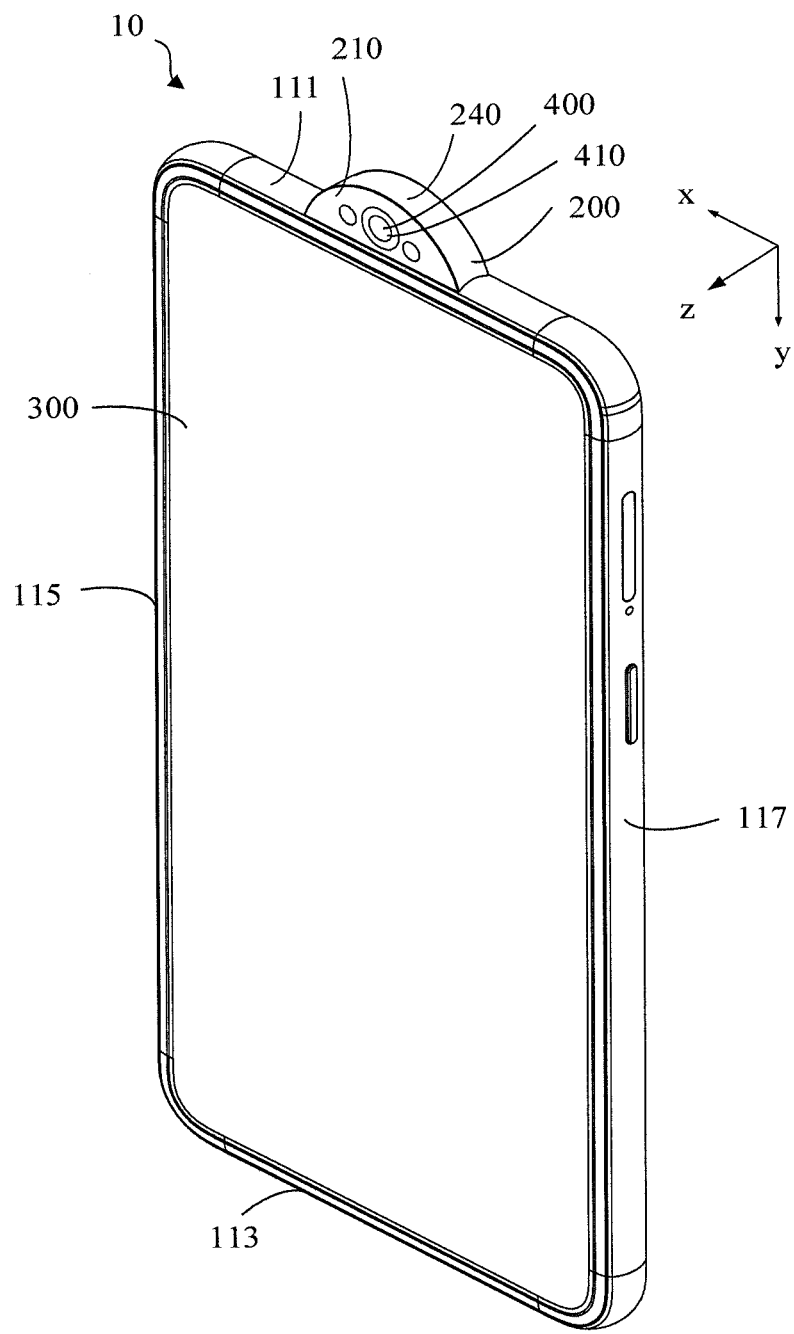
FIG. 1 illustrates a stereoscopic diagram of a viewing angle when a mounting seat of a mobile terminal is located at a second position in an embodiment.
Figure 2:
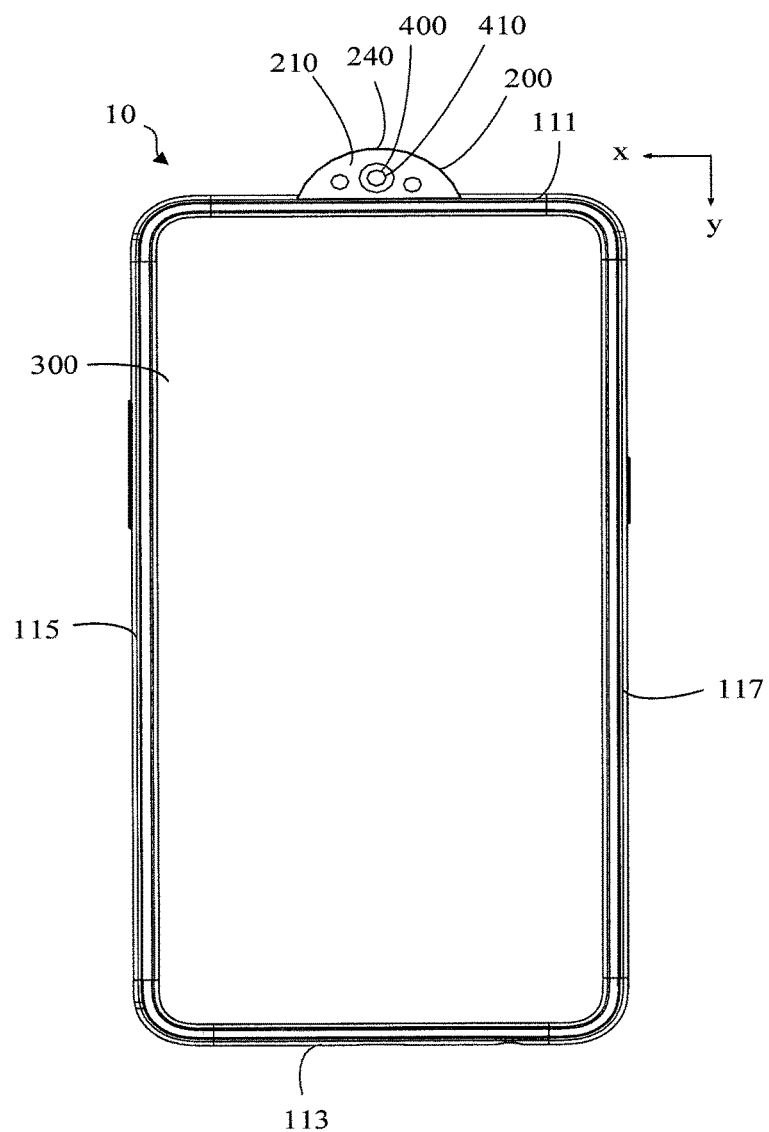
FIG. 2 illustrates a front view when a mounting seat of a mobile terminal illustrates in FIG. 1 is located at a second position.
Figure 3:
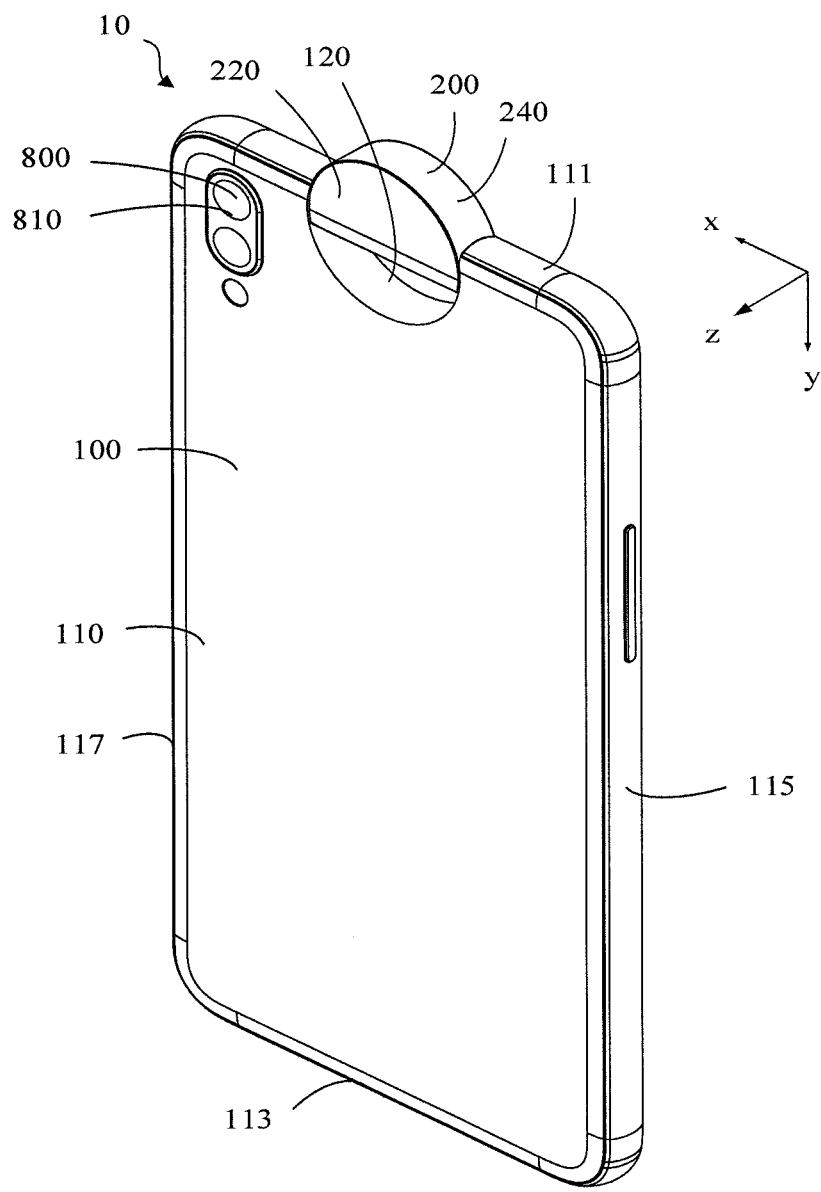
FIG. 3 illustrates a stereoscopic diagram of another viewing angle when a mounting seat of a mobile terminal illustrates in FIG. 2 is located at a second position.

As illustrated in FIG. 1 to FIG. 3, in one embodiment, the mobile terminal 10 is a mobile phone. The mobile terminal 10 includes a rear housing 100, a mounting seat 200, a display screen 300 and a photographing device 400. The rear housing 100 includes a first surface (not illustrated), a second surface 110 arranged opposite to the first surface, and a side circumference connected between the first surface and the second surface 110. The side circumference includes a first side circumference 111, a second side circumference 113 arranged opposite to the first side circumference 111, a third side circumference 115 and a fourth side circumference 117 arranged opposite to the third side circumference 115. The third side circumference 115 is connected between one end of the first side circumference 111 and one end of the second side circumference 113 at one side, and the fourth side circumference 117 is connected between another end of the first side circumference 111 and another end of the second side circumference 113 at another side. The display screen 300 is arranged at one side where the first surface is located. In one embodiment, the mobile terminal 10 is of a rectangular blocky shape approximately. The first side circumference 111 and the second side circumference 113 are respectively connected to two short edges of the rectangle, and the third side circumference 115 and the fourth side circumference 117 are respectively connected to two long edges of the rectangle, that is, the first side circumference 111 and the second side circumference 113 are respectively located at two ends of the mobile terminal 10 on a length direction, and the third side circumference 115 and the fourth side circumference 117 are respectively located at two ends of the mobile terminal 10 on a width direction. Further, in the embodiment in which the mobile terminal 10 is of the rectangular blocky shape, the first side circumference 111 is located on the top of the mobile terminal 10, and the second side circumference 113 is located at the bottom of the mobile terminal 10. A sound outlet and a connection port may be formed on the second side circumference 113, in which the sound outlet may be configured to send out a sound of a loudspeaker, and the connection port may be configured to correspondingly arrange a headset seat or a Universal Serial Bus (USB) seat, etc.

Figure 4:
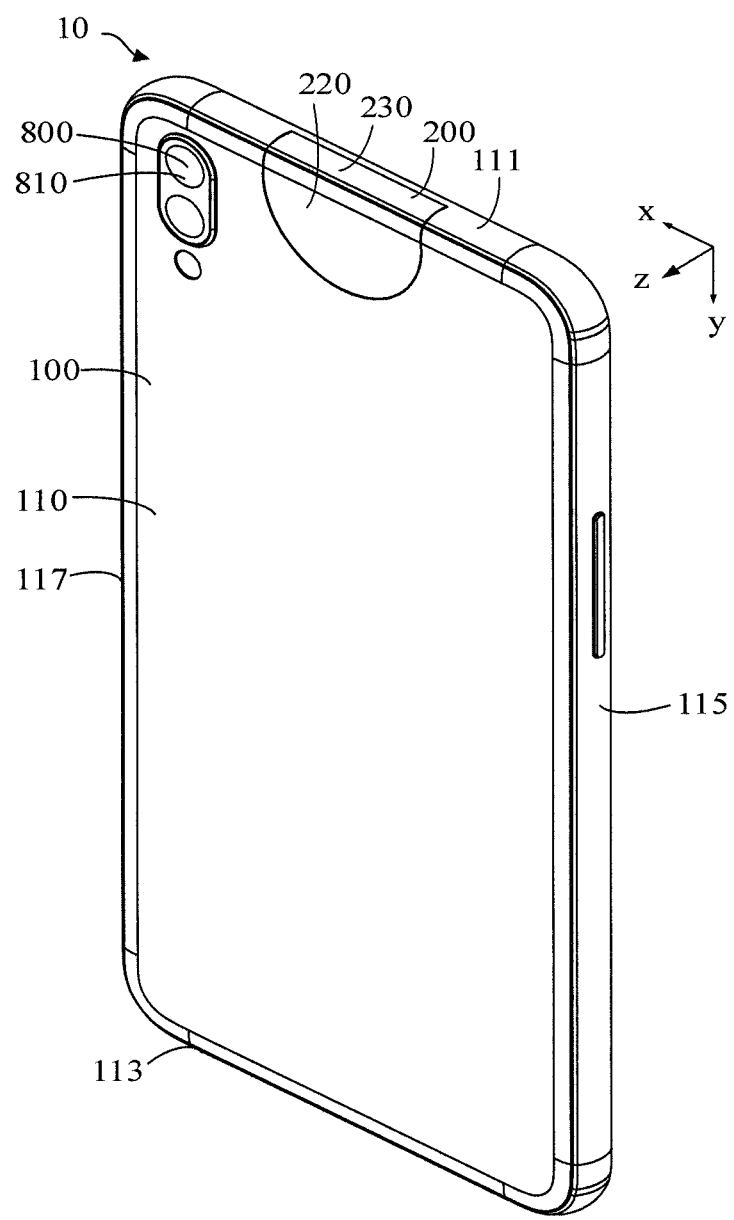
FIG. 4 illustrates a stereoscopic diagram of a viewing angle when a mounting seat of a mobile terminal illustrates in FIG. 1 is located at a first position.
Figure 5:
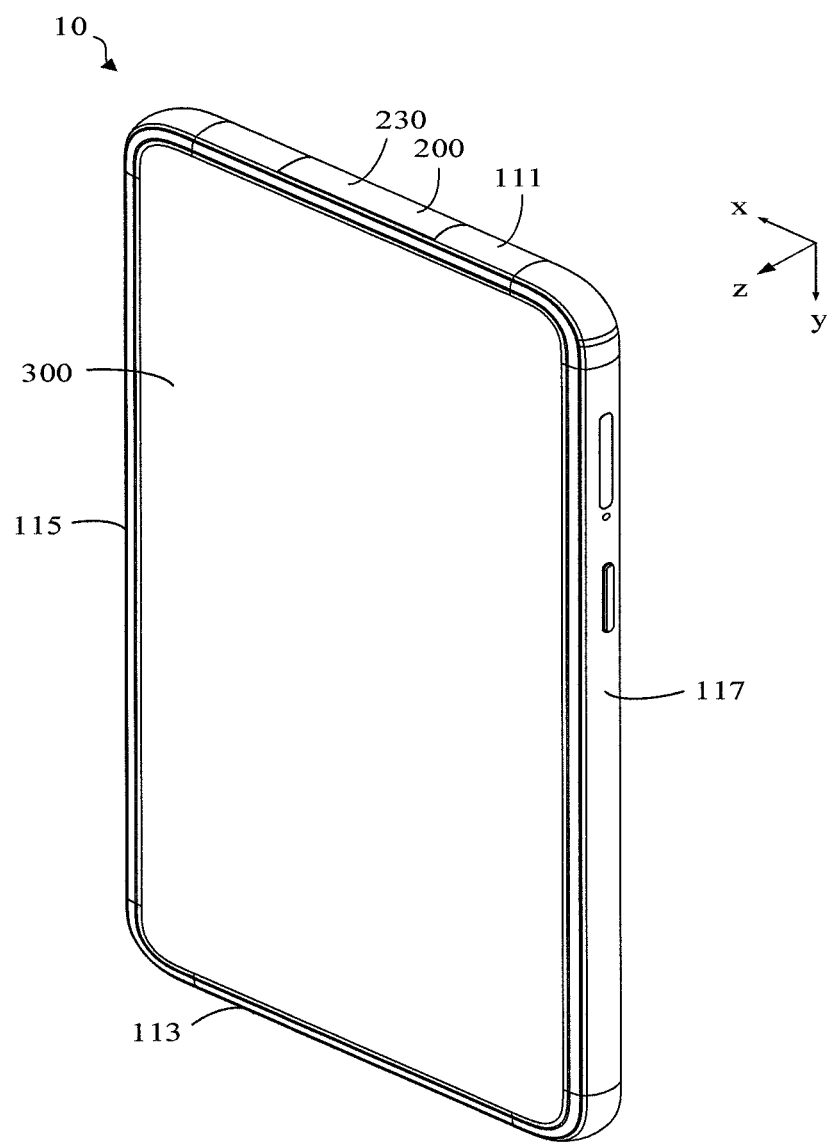
FIG. 5 illustrates a stereoscopic diagram of another viewing angle when a mounting seat of a mobile terminal illustrates in FIG. 4 is located at a first position.

The second surface 110 is sunken toward the first surface to form a groove 120. The groove 120 is penetrated through the first side circumference 111 and the groove 120 is located between the third side circumference 115 and the fourth side circumference 117. The mounting seat 200 is rotatablely connected to the rear housing 100. In one embodiment, a coordinate system is established by taking the width direction of the mobile terminal 10 as an x axis, the length direction of the mobile terminal 10 as a y axis and the thickness direction of the mobile terminal 10 as a z axis and a plane perpendicular to the z axis is set up to take as a reference plane; in this sense, a rotation axis of the mounting seat 200 passes through a circle center of a circumcircle of a positive projection of the mounting seat 200 on the reference plane. The photographing device 400 is arranged on the mounting seat 200. The photographing device 400 is provided with a first light entering surface 410. The first light entering surface 410 is toward the side where the display screen 300 is located and light rays may pass through the first light entering surface 410 and are irradiated to the photographing device 400. As illustrated in FIG. 4 and FIG. 5, when the mounting seat is at the first position, the photographing device 400 is located in the groove 120 and the first light entering surface 410 is blocked by the display screen 300. As illustrated in FIG. 1 and FIG. 3, when the mounting seat is at the second position, the photographing device 400 is located out of the groove 120 and the first light entering surface 410 is exposed from the side where the display screen 300 is located. After the photographing device 400 is exposed, a user may execute operations such as selfie, video communication or face identification. In one embodiment, the second surface 110 is a surface to which the user may contact directly. When the groove 120 is penetrated through the second surface 110 and the first side circumference 111, the groove 120 is located on the top of the mobile terminal 10 and is penetrated through the edges of the mobile terminal 10. After the mounting seat 200 is arranged in the groove 120, it may be exposed at the side where the second surface 110 is located. Moreover, the mounting seat 200 may expose a relatively large area to take as a force applying point of a hand, thereby being beneficial for the hand to rotate the mounting seat 200 and enabling that the photographing device 400 on the mounting seat 200 is exposed at the side where the display screen 300 is located. For example, by pressing the edges of the mounting seat 200 from the top of the mobile terminal 10, the mounting seat 200 may be rotated in the groove 120.

In one embodiment, the photographing device 400 may include at least one of a front camera, a distance sensor or an environmental light sensor. Specifically, in one embodiment, the front camera may be configured to provide functions such as the video communication and the selfie. The distance sensor may be configured to detect a distance between the display screen 300 and a user face, so that the display screen 300 can be turned on or turned off during a process when the user answers a telephone. The environmental light sensor may be configured to detect the brightness of environmental light, so that the display screen 300 can adjust the display brightness according the brightness of the environmental light and the user can view the information on the display screen 300 comfortably. In one embodiment, the photographing device 400 may further include an infrared lens, a dot projector and a floodlight sensing element. The infrared lens, the dot projector and the floodlight sensing element may be used in a face identification process of the mobile terminal 10. One or more of these electronic components may be mounted on the mounting seat 200. When the mounting seat 200 is located at the first position, the above-mentioned electronic components are held in the groove 120. When the mounting seat 200 is located at the second position, the above-mentioned electronic components may be exposed from the side where the display screen 300 is located. After the photographing device 400 is exposed, the user may execute the operations such as selfie, video communication or face identification.

According to the mobile terminal 10, the photographing device 400 is located in the groove 120 when the mounting seat is at the first position. When the mounting seat is at the second position, the first light entering surface 410 of the photographing device 400 is exposed from the side where the display screen 300 is located. The concealment and exposure of the photographing device 400 can be implemented through relative rotation between the mounting seat 200 and the rear housing 100, and thus the photographing device 400 may be prevented from occupying the area of the side where the display screen 300 of the module terminal 10 is located, thereby being beneficial to implementing the high screen-to-body ratio of the mobile terminal 10. Since the groove 120 is sunken from the second surface 110 to the first surface and the groove 120 is penetrated through the first side circumference 111 of the rear housing 100, i.e., the groove 120 is penetrated through the edges of the mobile terminal 10 and can enable the mounting seat 200 to expose, a relatively large force-applying area can be provided for the hand, the mounting seat 200 is pushed to rotate in the groove 120 and the convenience in use can be improved.

Figure 6:
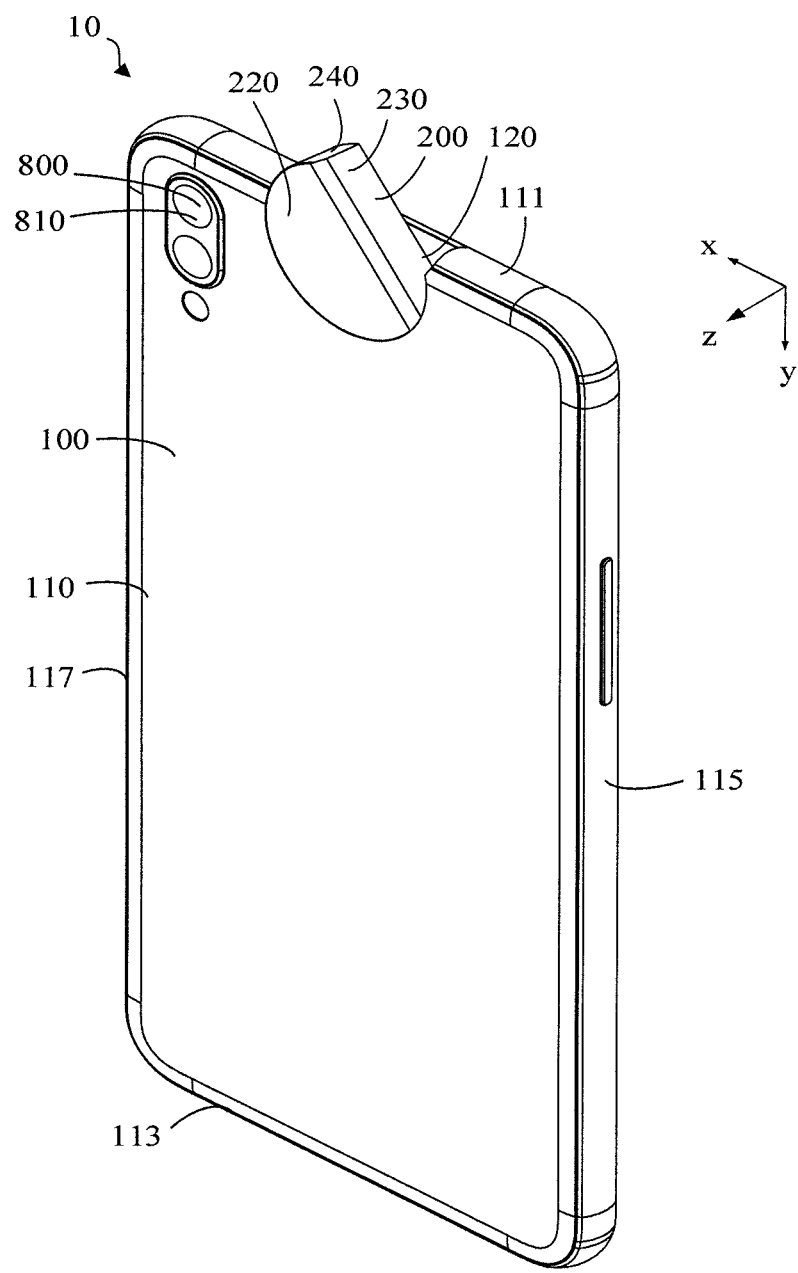
FIG. 6 illustrates a stereoscopic diagram when a mounting seat of a mobile terminal illustrates in FIG. 4 is located at a certain position between a first position and a second position.

As illustrated in FIG. 6, in one embodiment, a positive projection of the groove 120 on the reference plane is a superior arc. Further, in one embodiment, the superior arc of the positive projection of the groove 120 on the reference plane has a central angle that is greater than 180° and is smaller than 270°. When the central angle corresponding to the superior arc of the positive projection of the groove 120 on the reference plane is within the above range, there is a certain distance between the rotation axis of the mounting seat 200 and the first side circumference 111 of the mobile terminal 10, so as to prevent the arrangement of the rotation axis on the first side circumference 111 to result in that a rotation structure of the mounting seat 200 is protruded from the first side circumference 111 to bring adverse effect to the appearance of the mobile terminal 10.

In one embodiment, the shape of the mounting seat 200 is matched with that of the groove 120 and the positive projection of the mounting seat 200 on the reference plane is a superior arc. Through the mounting seat 200 with the above structure, the shape of the mounting seat 200 may be well matched with that of the groove 120 to keep the appearance integrity of the mobile terminal 10. For example, in one embodiment, the central angle corresponding to the superior arc of the positive projection of the groove 120 on the reference plane is equal to that of the superior arc of the positive projection of the mounting seat 200 on the reference plane. When the mounting seat is at the first position, the space between a sidewall of the groove 120 and a surface, toward the sidewall of the groove 120, of the mounting seat 200 may be relatively small, so the structure of the mounting seat 200 or the structure of the groove 120 may be prevented from generating adverse effect to the appearance of the mobile terminal 10. For example, when the mounting seat 200 adopting the above structure is located at the first position, the mobile terminal 10 has relatively good appearance integrity. It may be understood that, the mounting seat 200 may further be of other structures. For example, the positive projection of the mounting seat 200 on the reference plane may be of a polygon such as a parallelogram, a trapezoid or a pentagon. The groove 120 may provide an avoidance space for the polygon so that the mounting seat 200 can be rotated in the groove 120.

In one embodiment, along the thickness direction of the mobile terminal 10, the ratio of the maximum depth of the groove 120 to the maximum thickness of the mobile terminal 10 is smaller than 0.8. In this way, the groove 120 may be prevented from occupying excessively large size along the thickness direction of the mobile terminal 10 and the display screen 300 at the position where the groove 120 is located is prevented from having insufficient strength. In one embodiment, on the width direction of the mobile terminal 10, the ratio of the maximum width of the groove 120 to the maximum width of the mobile terminal 10 is smaller than 0.7. By virtue of the above structure, the groove 120 may be prevented from occupying excessively large size on the length direction of the mobile terminal 10, and the mounting space inside the mobile terminal 10 is prevented from decreasing relatively to mount the electronic components of the mobile terminal 10 difficulty.

In one embodiment, the second surface 110 is respectively in smooth transition with the first side circumference 111 and the second side circumference 113. Specifically, curved surface transition such as arc transition may be adopted at the junction of the second surface 110 and the first side circumference 111, so that the second surface 110 is in smooth transition with the first side circumference 111. In one embodiment, the curved surface transition such as the arc transition may be adopted at the junction of the second surface 110 and the second side circumference 113, so that the second surface 110 is in smooth transition with the second side circumference 113. In one embodiment, the curved surface transition such as the arc transition may also be adopted at the junction of the second surface 110 and the third side circumference 115 or the fourth side circumference 117, so that the second surface 110 is in smooth transition with the third side circumference 115 or the fourth side circumference 117. Further, in one embodiment, at the junctions of the first side circumference 111 with the third side circumference 115 and the fourth side circumference 117, and at the junctions of the second side circumference 113 with the third side circumference 115 and the fourth side circumference 117, the curved surface smooth transition may also be adopted. Through the above structure, the appearance of the mobile terminal 10 may be relatively beautiful.

In one embodiment, the mounting seat 200 includes an inner surface 210, an outer surface 220 arranged opposite to the inner surface 210, and an outer circumference connected between the inner surface 210 and the outer surface 220. The outer circumference includes a first outer circumference 230 and a second outer circumference 240. A positive projection of the second outer circumference 240 on the reference plane is a circular arc. As illustrated in FIG. 5, when the mounting seat is at the first position, the first outer circumference 230 is aligned with the first side circumference 111. As illustrated in FIG. 3, when the mounting seat is at the second position, the first outer circumference 230 is staggered with the first side circumference 111. Further, in one embodiment, the outer surface 220 of the mounting seat 200 is in smooth transition with the first outer circumference 230. For example, arc smooth transition may be adopted by the outer surface 220 and the first outer circumference 230. In one embodiment, a radian of an arc surface at the junction of the outer surface 220 and the first outer circumference 230 is consistent with that of an arc surface at the junction of the second surface 110 and the first side circumference 111. When the mounting seat is at the first position, the appearances of the first outer circumference 230 and the first side circumference 111 have relatively good integrity and thus the appearance integrity of the mobile terminal 10 is improved.

In one embodiment, the outer surface 220 is aligned with the second surface 110. Through the above arrangement, the outer surface 220 may keep relatively good appearance integrity with the second surface 110 when the mounting seat is at the first position. In one embodiment, the outer surface 220 is provided with a decorative pattern, or a non-slip stripe, or a non-slip groove. The non-slip stripe or the non-slip groove is beneficial to increasing a friction coefficient between fingers and the mounting seat 200, and thus the fingers apply a force to the mounting seat 200 better to rotate the mounting seat 200 and implement the concealment and exposure of the photographing device 400. Specifically, in one embodiment, the decorative pattern may be a constellation pattern and the like and may make the appearance of the mobile terminal 10 beautiful. With the non-slip groove or the non-slip stripe, a protruded or sunken place is provided on the outer surface 220, which is beneficial to increasing the friction coefficient between the fingers and the mounting seat 200.

Figure 7:
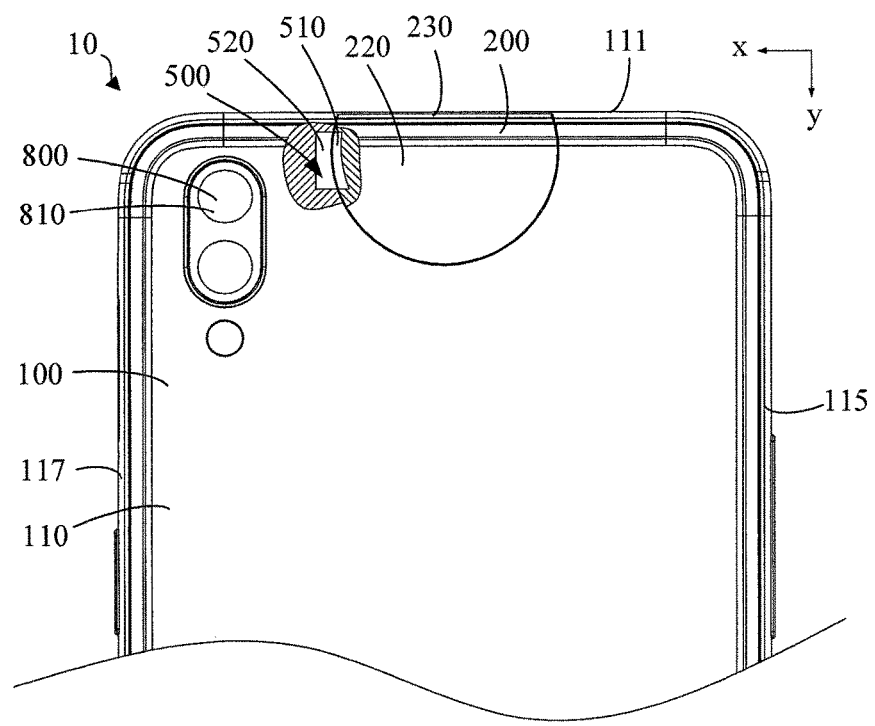
FIG. 7 illustrates a local sectional view when a mounting seat is located at a first position in an embodiment of a mobile terminal illustrates in FIG. 4.

As illustrated in FIG. 7, in one embodiment, the mobile terminal 10 further includes a magnetic adsorption component 500; the magnetic adsorption component 500 includes a magnet 510 and an adsorption piece 520; the magnet 510 is arranged on the second outer circumference 240; the adsorption piece 520 is arranged on the rear housing 100; and when the mounting seat is at the first position, the magnet 510 can be adsorbed to the adsorption piece 520. Specifically, in one embodiment, the magnet 510 is a permanent magnet and the adsorption piece 520 is an iron piece. When the mounting seat 200 is located at the first position, the magnet 510 may be adsorbed to the adsorption piece 520, so that the mounting seat 200 is reliably positioned at the groove 120, the mounting seat 200 is prevented from easily rotating out from the groove 120 and a protective effect is taken to the mounting seat 200. In other embodiments, the adsorption piece 520 may also be the permanent magnet. It may be understood that, the magnet 510 may also be arranged on the rear housing 100, and the adsorption piece 520 may also be arranged on the mounting seat 200, which is also beneficial to buckling the mounting seat 200 into the groove 120.

Figure 8:
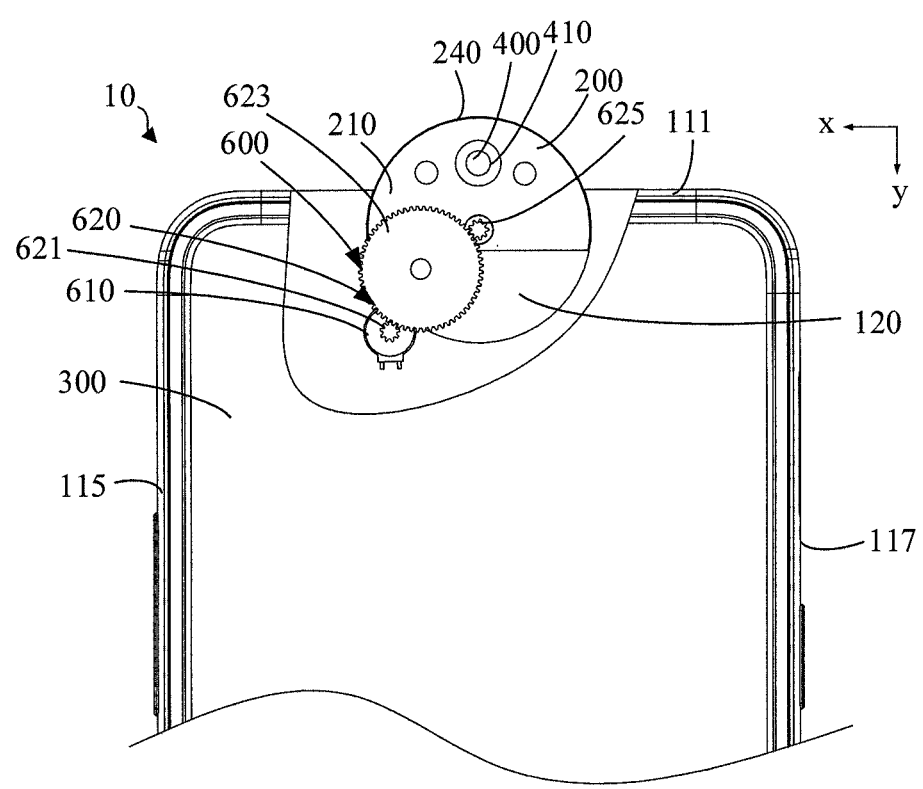
FIG. 8 illustrates a local sectional view when a mounting seat is located at a second position in another embodiment of a mobile terminal illustrates in FIG. 4.
Figure 9:
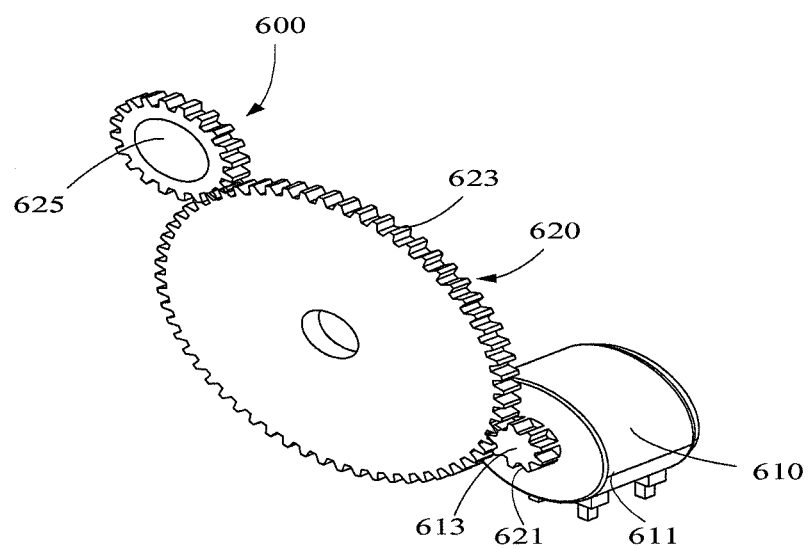
FIG. 9 illustrates a stereoscopic diagram of a drive mechanism of a mobile terminal illustrates in FIG. 8.

As illustrated in FIG. 8 and FIG. 9, in one embodiment, the mobile terminal 10 further includes a drive mechanism 600; the drive mechanism 600 includes a motor 610 and a gear component 620; the motor 610 includes a seat body 611 and an output shaft 613; the seat body 611 is connected to the rear housing 100; the seat body 611 is connected to the output shaft 613; the gear component 620 is respectively connected to the output shaft 613 and the mounting seat 200; and the seat body 611 can drive the output shaft 613 to rotate, so that the output shaft 613 drives the mounting seat 200 via the gear component 620 to rotate in the groove 120. Specifically, in one embodiment, the gear component 620 includes a first gear 621, a second gear 623 and a third gear 625, the output shaft 613 is fixedly connected to the first gear 621 and the third gear 625 is fixedly connected to the mounting seat 200. The second gear 623 is respectively meshed with the first gear 621 and the third gear 625. The output shaft 613 can drive the first gear 621 to rotate, the first gear 621 can drive the second gear 623 to rotate, and the second gear 623 can drive the mounting seat 200 via the third gear 625 to rotate in the groove 120.

In the embodiment, the motor 610 is a step motor. The step motor 610 is easy to control a rotation angle and obtain relatively high control accuracy. In one embodiment, the motor 610 is in communication connection with a microprocessor of the mobile terminal 10. Through the microprocessor, the operation of the motor 610 can be controlled, and thus the rotation of the mounting seat 200 may be controlled.

The above arrangement is beneficial to electrification in rotation of the mounting seat 200. For example, a virtual key may be arranged on the mobile terminal 10. The rotation of the mounting seat 200 is controlled by a program, thereby being beneficial to improving the user experience. It may be understood that, the second gear 623 may take a transition effect between the first gear 621 and the third gear 625, which is beneficial to installing the motor 610 and the mounting seat 200 and preventing the thickness of the mobile terminal 10 from being excessively increased. It may be understood that, the second gear 623 may also be omitted, the first gear 621 may be directly meshed with the third gear 625, and the motor 610 can also drive the rotation of the mounting seat 200 via the first gear 621 and the third gear 625. It may be understood that, the first 621 may be integrally moulded with the output shaft 613 of the motor 610 to simplify a connecting structure between the first gear 621 and the motor 610. It may be understood that, the third gear 625 may also be moulded with the mounting seat 200 integrally to simplify a connecting structure between the third gear 625 and the mounting seat 200.

As illustrated in FIG. 7, in one embodiment, the mobile terminal 10 may further include a rear photographing device 800 arranged on the rear housing 100. The rear photographing device 800 is provided with a second light entering surface 810. The second light entering surface 810 is opposite to the display screen 300. The light rays can pass through the second light entering surface 810 and are irradiated to the second photographing device. Further, in one embodiment, the rear photographing device 800 includes a rear camera, a flash lamp and a focusing sensor. The mobile terminal 10 further includes a mainboard arranged between the display screen 300 and the rear housing 100. The rear camera, the flash lamp and the focusing sensor all are in communication connection with the mainboard. It may be understood that, the flash lamp may supplement light to the shooting of the rear camera and the focusing sensor is beneficial to focusing of the rear camera. For example, the focusing sensor may be an infrared focusing sensor or a laser focusing sensor. The infrared focusing sensor or the laser focusing sensor is beneficial to improving the shooting quality of the camera, which will not be elaborated here one by one.

Figure 10:
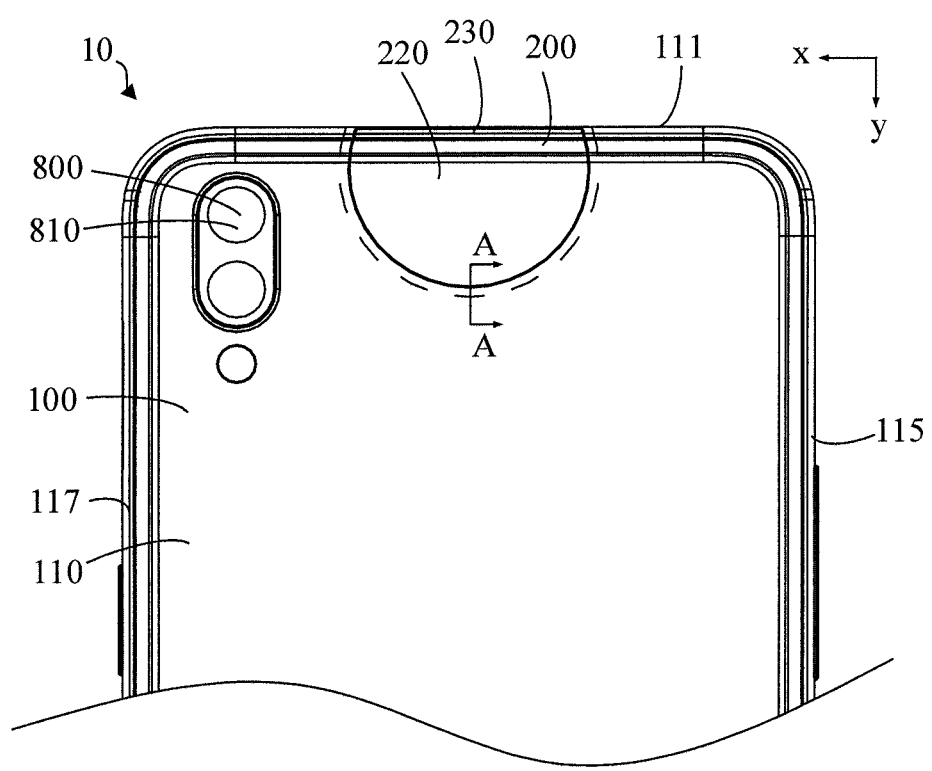
FIG. 10 illustrates a rear view when a mounting seat is located at a first position in a still another embodiment of a mobile terminal illustrates in FIG. 4.
Figure 11:
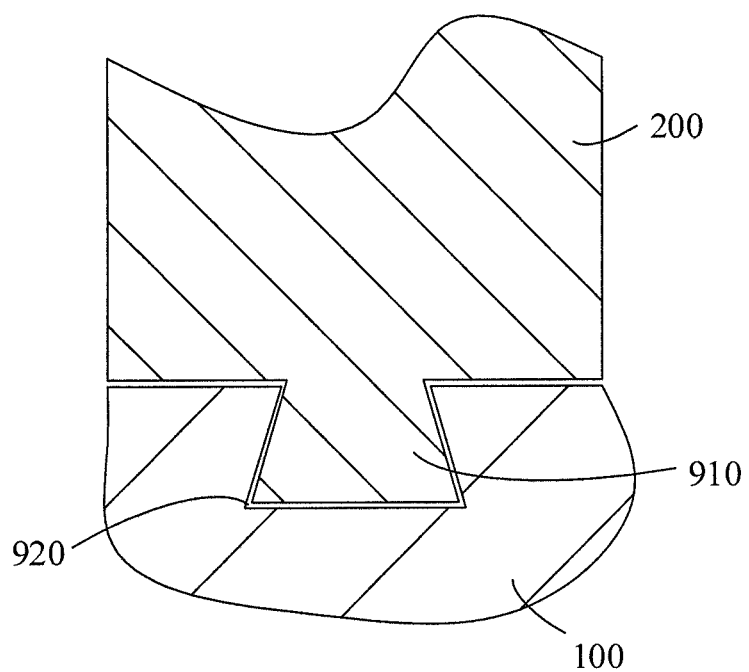
FIG. 11 illustrates a local sectional view of a mobile terminal illustrates in FIG. 10 along an A-A place.

As illustrated in FIG. 10 and FIG. 11, in another embodiment, the mobile terminal 10 may further include an arc guide rail 910 arranged on the mounting seat 200; a guide groove 920 is formed on the rear housing 100; and the arc guide rail 910 and the guide groove 920 are in slide fit so that the mounting seat 200 can be rotated relative to the rear housing 100. Through the arc guide rail 910 and the guide groove 920, when the arc guide rail 910 is slid in the guide groove 920, the mounting seat 200 can also be rotated relative to the rear housing 100, so that the photographing device 400 is concealed in the groove 120 or exposed from the groove 120. When the slide fit of the arc guide rail 910 and the guide groove 920 is adopted, a rotation structure between the mounting seat 200 and the rear housing 100 may not be necessarily provided with the rotating shaft and thus the structure of the mounting seat 200 may be simplified. It may be understood that, the arc guide rail 910 and the mounting seat 200 may be integrally moulded to simplify the structure of the mounting seat 200.

Each technical characteristic of the above embodiments may be combined freely. To describe briefly, all possible combinations for the each technical characteristic of the above embodiments are not described. However, as long as there is no conflict among the combinations of the technical characteristics, all should be considered as a scope recorded by the specification.

The above embodiments only express several implementation manners of the disclosure, and the description is specific and detail but cannot be understood as the limit to the scope of the disclosure. It is to be noted that, those of ordinary skill in the art may further make several variations and improvements without departing from the concept of the disclosure and all pertain to the scope of protection of the disclosure. Accordingly, the scope of protection of the disclosure should be subject to the appended claims.

The invention claimed is:

1. A mobile terminal, comprising:
a rear housing, comprising a first surface, a second surface arranged opposite to the first surface, and a side circumference connected between the first surface and the second surface, wherein the side circumference comprises a first side circumference, a second side circumference arranged opposite to the first side circumference, a third side circumference and a fourth side circumference arranged opposite to the third side circumference; the third side circumference is connected between one end of the first side circumference and one end of the second side circumference at one side, and the fourth side circumference is connected between another end of the first side circumference and another end of the second side circumference at another side; the second surface is sunken toward the first surface to form a groove; the groove is penetrated through the first side circumference; and the groove is located between the third side circumference and the fourth side circumference;
a display screen, arranged at one side where the first surface is located;
a mounting seat, arranged in the groove and capable of being rotated relative to the rear housing, wherein a rotation axis of the mounting seat passes through a circle center of a circumcircle of a positive projection of the mounting seat on a reference plane; and the reference plane is perpendicular to the thickness direction of the mobile terminal; and
a photographing device, arranged on the mounting seat, wherein the photographing device is provided with a first light entering surface; the mounting seat is capable of being rotated relative to the rear housing through a first position and a second position; when the mounting seat is at the first position, the photographing device is located in the groove and the first light entering surface is blocked by the display screen; and when the mounting seat is at the second position, the photographing device is located out of the groove and the first light entering surface is exposed from one side where the display screen is located.

2. The mobile terminal of claim 1, wherein the groove has a positive projection on the reference plane which is a superior arc; and/or, the positive projection of the mounting seat on the reference plane is a superior arc.

3. The mobile terminal of claim 2, wherein the superior arc of the positive projection of the groove on the reference plane has a central angle that is greater than 180° and is smaller than 270°.

4. The mobile terminal of claim 1, wherein along the thickness direction of the mobile terminal, the ratio of the maximum depth of the groove to the maximum thickness of the mobile terminal is smaller than 0.8.

5. The mobile terminal of claim 4, wherein along the thickness direction of the mobile terminal, the ratio of the maximum width of the groove to the maximum width of the mobile terminal is smaller than 0.7.

6. The mobile terminal of claim 1, wherein the mounting seat comprises an inner surface, an outer surface arranged opposite to the inner surface, and an outer circumference connected between the inner surface and the outer surface; the outer circumference comprises a first outer circumference and a second outer circumference; a positive projection of the second outer circumference on the reference plane is a circular arc; when the mounting seat is at the first position, the first outer circumference is aligned with the first side circumference; and when the mounting seat is at the second position, the first outer circumference is staggered with the first side circumference.

7. The mobile terminal of claim 6, wherein the outer surface is aligned with the second surface.

8. The mobile terminal of claim 6, further comprising a magnetic adsorption component, wherein the magnetic adsorption component comprises a magnet and an adsorption piece; the magnet is arranged on the second outer circumference; the adsorption piece is arranged on the rear housing; and when the mounting seat is at the first position, the magnet can be adsorbed to the adsorption piece.

9. The mobile terminal of claim 6, wherein the outer surface is provided with a decorative pattern, a non-slip stripe or a non-slip groove.

10. The mobile terminal of claim 1, further comprising a drive mechanism, wherein the drive mechanism comprises a motor and a gear component; the motor comprises a seat body and an output shaft; the seat body is connected to the rear housing; the seat body is connected to the output shaft; the gear component is connected to the output shaft and the mounting seat; and the seat body can drive the output shaft to rotate, so that the output shaft drives the mounting seat via the gear component to rotate in the groove.

11. The mobile terminal of claim 10, wherein the gear component comprises a first gear, a second gear and a third gear; the output shaft is fixedly connected to the first gear; the third gear is fixedly connected to the mounting seat; the second gear is meshed with the first gear and the third gear; the output shaft can drive the first gear to rotate; the first gear can drive the second gear to rotate; and the second gear can drive the mounting seat via the third gear to rotate in the groove.

12. The mobile terminal of claim 1, wherein the second surface is in smooth transition with the first side circumference and the second side circumference; and/or the second surface is in smooth transition with the third side circumference and the fourth side circumference.

13. The mobile terminal of claim 1, further comprising an arc guide rail arranged on the mounting seat, wherein a guide groove is formed on the rear housing; and the arc guide rail and the guide groove are in slide fit so that the mounting seat is capable of being rotated relative to the rear housing.

* * * * *